May 7, 1935.   J. A. HEMPSTEAD   2,000,464
AIR MIXING DEVICE FOR GASEOUS FUELS
Filed March 1, 1933
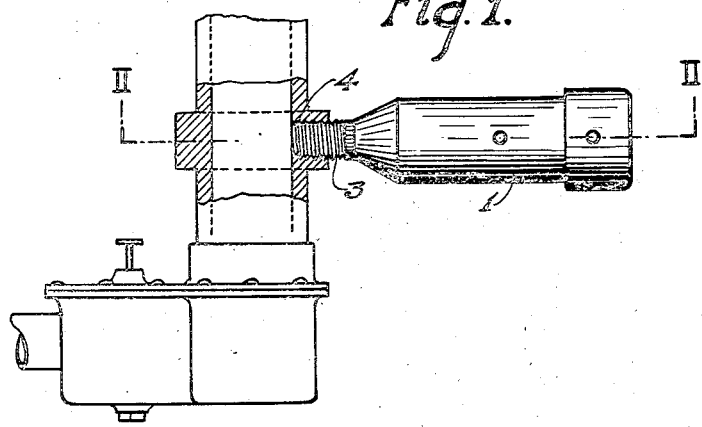
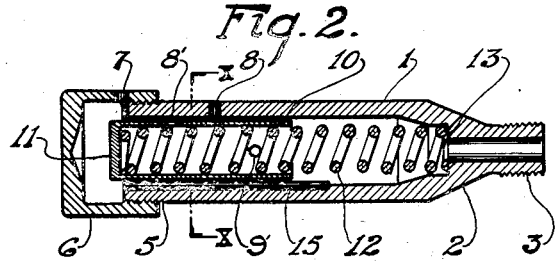
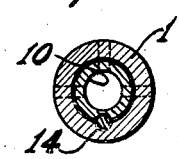
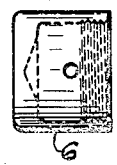
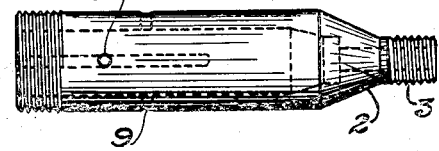
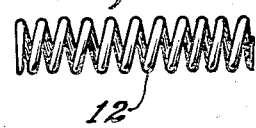
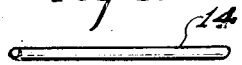
INVENTOR
Joseph A. Hempstead
by William B. Jasper
Attorney Patented May 7, 1935

2,000,464

UNITED STATES PATENT OFFICE 2,000,464

AIR MIXING DEVICE FOR GASEOUS FUELS

Joseph A. Hempstead, Pittsburgh, Pa.

Application March 1, 1933, Serial No. 659,152

2 Claims. (Cl. 251—144)

This invention relates to a device for use in internal combustion engines for diluting the gaseous fuel delivered to the combustion chambers, and it is among the objects thereof to provide an efficient and simple device which can be readily attached to the fuel intake passage of internal combustion engines, and which shall be adapted to dilute the combustible mixture of air and vaporized fuel in accordance with the power demand and speed of the engine, and which in its operation shall be responsive to the negative pressure or suction produced by the engine to provide regulable volumes of air under the different operating conditions met with in the use of such engines for automotive vehicles.

These and other objects of the invention will become more apparent from a consideration of the accompanying drawing constituting a part hereof in which like reference characters designate like parts and in which:

Figure 1 is a side elevational view partially in section of a carburetor and a portion of the intake manifold of an internal combustion engine illustrating the embodiment of the invention therein;

Figure 2 a cross-sectional view of the dilution device embodying the principles of this invention;

Figure 3 a side elevation of the cap portion of the device shown in Figure 2;

Figure 4 a side elevational view of the diluting mechanism;

Figure 5 a top plan view thereof;

Figure 6 a top plan view of a hollow plunger member embodied in the construction shown in Figure 2;

Figure 7 a side elevational view of the plunger;

Figure 8 a side elevational view of the coil spring illustrated in Figure 2;

Figure 9 a guide rod utilized in a manner to be hereinafter explained; and,

Figure 10, a cross sectional view of the device shown in Figure 2 taken along the line X—X thereof.

With reference to the several figures of the drawing, the structure therein illustrated comprises a hollow sleeve generally designated by the reference numeral 1 having a tapered end portion 2 terminating in a threaded portion 3 which is adapted to interact with the thread 4 provided in the wall of the intake manifold of an internal combustion engine above the throttle valve in the manner illustrated in Figure 1 of the drawing. The opposite end of the member 1 is provided with a screw thread portion 5 adapted to interact with the thread of a cap element 6, the cap being provided with a port 7 for admitting air to the interior of the sleeve 1. Sleeve 1 is also provided with a plurality of staggered ports 8 and 9 as shown in Figure 4 of the drawing. A hollow plunger 10 is disposed within the hollow interior of the sleeve 1, the plunger being open at one end and closed at its other end 11 which end constitutes an abutment for a coil spring 12, the other end of which abuts in the shoulder 13 provided within the constricted portion of the sleeve member 1. Coil spring 12 functions to normally bias the hollow plunger 10 in the direction of the cap 6 against which it abuts under normal conditions.

The hollow plunger 10 is provided with ports 8' and 9' corresponding to the ports 8 and 9 of the sleeve 1 when in radial alinement therewith, and the ports 8' and 9' are maintained in proper alinement for all conditions of sliding movement of the hollow plunger by means of a guide pin 14, Figure 9 of the drawing.

The guide pin 14 is disposed in a groove 15 provided in the inner wall of the sleeve 1 and a groove 15' provided on the exterior of the hollow plunger 10. Once the pin 14 has been disposed in the grooves 15, 15', the hollow plunger 10 will maintain a constant position with respect to sleeve 1 whereby ports 8, 8', 9, 9', may be brought in register.

The device which is in the nature of a multiport valve is assembled in the manner shown in Figure 2 of the drawing and is then mounted on the fuel intake passage between the carburetor and the combustion chambers of the engine in the manner shown in Figure 1 of the drawing.

The operation of the above described valve mechanism is briefly as follows: It is well-known to the users of automotive vehicles that the maximum vacuum or suction in the intake fuel line of an engine exists when the throttle is closed which is generally during the idling of the engine and that the minimum amount of suction is available when the throttle is opened during speeding of the motor, this being observable in the operation of a windshield wiper that is connected to the vacuum tank or suction line of an engine.

In accordance with the construction of the hereinbefore described valve, the suction acting on the plunger 10 will retract the plunger against the action of the coil spring 12 away from the cap 6 as shown in Figure 2 of the drawing.

Ports 8', 9', of the hollow plunger 10 are spaced a greater distance apart than the corresponding ports 8 and 9 of the sleeve 1 so that when the engine is operating at low speeds and maximum vacuum, the plunger 10 will be drawn-in a maximum amount against the tension of spring 12 until port 8' registers with the port 8 of the sleeve, and air is permitted to pass through the port 8 into the hollow interior of the valve sleeve 1 from which it passes into the fuel intake line or manifold to dilute the gaseous fuel passing to the combustion chambers.

As the speed of the engine increases, and the vacuum correspondingly decreases, the action of the spring 12 will return the plunger 10 until only a slight amount of vacuum is available to keep it from seating against the end cap 6. In this position, ports 9, 9', will register and a maximum volume of air will be drawn into the fuel line to dilute the gaseous fuel as there is a double set of ports 9, 9', of an aggregate greater volume than the single set of ports 8, 8'.

At maximum speed, the vacuum will be substantially ineffective on the hollow plunger 10 which will, by action of the coil spring 12, abut against the end cap 6, and in this position a small amount of air will leak through ports 7 and around grooves 15, 15' to the interior of the valve chamber. Thus, at all engine speeds there will be some dilution of the fuel with air, the amount varying in accordance with the degree of vacuum in the fuel line which, of course, varies with the load and speed conditions of the engine.

While I am aware that other devices for diluting fuel with air have been heretofore proposed, none of them discloses a plunger in a cylinder that is sufficiently sensitive to respond to minor variations in the negative pressure or suction of the fuel line, and such devices therefore fail to attain the result that is sought by the use of these devices. By means of the plunger and spring members together with the variable sizes or number of openings of the ports for the different positions of the plungers, I am able to dilute the gaseous fuels in accordance with any specific requirement under the different operating conditions, thereby effecting a maximum of economy in the use of fuel without minimizing the power of the engine under load conditions.

It is evident from the foregoing description of this invention that a fuel dilution device of the character therein described is of simple construction and readily applied to internal combustion engines, and that such a structure is efficient in its operation and fully responsive to the vacuum conditions upon the operation of which its function is dependent.

Although one embodiment of the invention has been herein illustrated and described, it will be obvious to those skilled in the art that various modifications may be made in the details of construction without departing from the principles herein set forth.

I claim:

1. A device for diluting gaseous fuels as they are drawn into the combustion chambers of internal combustion engines, comprising a valve sleeve open at one end and capped at its other end and adapted to be placed in the fuel intake line between the throttle valve and the combustion chambers with its interior chamber in communication with the fuel intake passage, a hollow plunger operatively disposed within said valve chamber, a spring disposed within said plunger abutting at one end against a shoulder provided in the valve sleeve, said sleeve having a plurality of angularly and axially spaced ports, and said plunger having angularly and axially spaced ports the spacing of which is such that different ports of the sleeve and plunger will be in register singly and in multiples for different axial positions of the plunger, and means for maintaining the ports of the plunger and valve sleeve in cooperative alinement for any movement of said plunger in the valve sleeve.

2. A device for diluting gaseous fuels drawn into the combustion chambers of internal combustion engines, comprising a valve casing adapted to be connected in communication with the fuel passage between the throttle valve and the combustion chambers, and being capped at one end, a hollow plunger disposed in said casing having a spring disposed therein and adapted to normally bias said plunger against the capped end of said casing, said valve sleeve and plunger being provided with ports in angularly and axially spaced relation, and guide means for restraining said plunger against rotary movement whereby the plunger is axially movable in response to variations in the pressures produced in the fuel intake passage, thereby controlling the several port openings of said valve sleeve, said guide means constituting an air passage in any position of said plunger.

JOSEPH A. HEMPSTEAD.